United States Patent [19]

Taniguchi et al.

[11] Patent Number: 4,816,861
[45] Date of Patent: Mar. 28, 1989

[54] FOCUS CONDITION DETECTING DEVICE

[75] Inventors: Nobuyuki Taniguchi, Nishinomiya; Tokuji Ishida, Daito; Masataka Hamada, Minamikawachi; Toshihiko Karasaki; Toshio Norita, both of Sakai, all of Japan

[73] Assignee: Minolta Camera Kabushiki Kaisha, Osaka, Japan

[21] Appl. No.: 131,084

[22] Filed: Dec. 8, 1987

Related U.S. Application Data

[63] Continuation of Ser. No. 945,879, Dec. 23, 1986, Pat. No. 4,716,434.

[30] Foreign Application Priority Data

Dec. 23, 1985 [JP] Japan .................................. 60-291149

[51] Int. Cl.$^4$ .................................................. G03B 3/00
[52] U.S. Cl. ........................................ 354/408; 250/201; 250/204
[58] Field of Search ............... 354/402, 403, 406, 407, 354/408; 250/201, 201 PF, 204

[56] References Cited

U.S. PATENT DOCUMENTS

| | | | |
|---|---|---|---|
| 4,387,975 | 6/1983 | Araki | 354/407 |
| 4,492,448 | 1/1985 | Ishikawa et al. | 354/406 |
| 4,523,829 | 6/1985 | Eguchi et al. | 354/406 |
| 4,573,784 | 3/1986 | Suzuki | 354/408 X |
| 4,633,073 | 12/1986 | Horikawa | 354/403 X |
| 4,636,624 | 1/1987 | Ishida et al. | 354/406 X |
| 4,647,174 | 3/1987 | Tsunekawa et al. | 354/407 X |
| 4,660,969 | 4/1987 | Sorimachi et al. | 354/403 X |
| 4,687,917 | 8/1987 | Kusaka et al. | 354/408 X |
| 4,716,434 | 12/1987 | Taniguchi et al. | 354/408 |
| 4,734,571 | 3/1988 | Hamoda et al. | 250/201 |

FOREIGN PATENT DOCUMENTS 183879 2/1985 Japan .

OTHER PUBLICATIONS

U.S. Ser. No. 924,888–patent application, Group Art Unit 257.
U.S. Ser. No. 735,569–patent application, Group Art Unit 255.

Primary Examiner—W. B. Perkey
Attorney, Agent, or Firm—Price, Gess & Ubell

[57] ABSTRACT

A focus condition detecting device which generated first and second light intensity distribution signals representing light intensity distributions on first and second arrays arranged to receive lights having passed through different areas of the exit pupil of an objective lens is arranged so as to divide the first light intensity distribution signal into a plurality of blocks. Each of the portions of the first light intensity distribution signal belonging to the respective blocks is shifted relative to the second light intensity distribution signal by sequentially changing an amount of shift, so that correlations therebetween are calculated for finding the amount of shift providing the highest correlation. In accordance with the amount of shift found to provide the highest correlation through the correlation calculation with use of the portion of the first light intensity distribution signal belonging to one of the blocks, the shift range for the succeeding correlation calculation with use of the portion of the first light intensity distribution signal belonging to another one of the blocks is restricted to shorten the period of time required for the succeeding correlation calculation.

3 Claims, 11 Drawing Sheets

FOCUS CONDITION DETECTING DEVICE

This is a continuation of application Ser. No. 945,879, filed Dec. 23, 1986, now U.S. Pat. No. 4,716,434.

BACKGROUND OF THE INVENTION

1. FIELD OF THE INVENTION

The present invention relates to a focus condition detecting the device for a camera which detects focus condition of an objective lens of a camera from an object light having passed through the object lens.

2. DESCRIPTION OF THE PRIOR ART

There has been known a focus condition detecting device in which two images are formed by refocusing light bundles of an object light having passed through first and second areas of an objective lens which symmetric with respect to the optical axis of the objective lens. A relative distance between these two images is calculated and a defocus amount of the focus position from a predetermined focus position and a direction of the defocus are determined based on the relative distance calculated.

A typical optical system for such a focus condition detecting device as mentioned above is shown in FIG. 1.

In this system, a condenser lens 6 is usually arranged on a predetermined focal plane 4 of an objective lens 2 or on a plane positioned behind the focal plane and two refocusing lenses 8 and 10 are arranged rearside of the condenser lens 6. There are also arranged two image sensors 12 and 14 on each of focal planes of two refocusing lenses. Each of the image sensors 12 and 14 is comprised of a CCD (charge coupled device) image sensor having a plurality of light sensing elements.

The condenser lens 6 is so designed that effective ranges of the first and second refocusing lenses 8 and 10 can be projected within the exit pupil of the objective lens in order to form first and second images by light bundles having passed through the exit pupil and first and second refocusing lenses.

As shown in FIG. 2 schematically, when an image (A) of an object is focused frontside of the predetermined focal plane 4, two images a and a' are formed on the image sensors 12 and 14 so as to approach to each other with respect to the optical axis 18 of the objective lens. On the contrary to the above, when an image (B) of an object is focused rearside of the predetermined focal plane 4, two images b, b' are formed apart from each other. If an image is focused just on the predetermined focal plane 4, a distance between two corresponding points of the two images formed on two image sensors 12 and 14 becomes a specific value which is determined by the composition of the optical system of the focus condition detecting device. Accordingly, a focus condition of the objective lens can be determined from the distance between two corresponding points of the two images formed on the image sensors 12 and 14.

The detection of the distance mentioned above can be made as follows.

FIG. 3 shows a principle of operation therefor schematically. As shown therein, the first and second image sensors 12 and 14 are comprised of ten and sixteen cells of photodiodes ($a_1, \ldots, a_{10}$) and ($b_1, \ldots, b_{16}$), respectively. Now, assume that each symbol of an individual cell represents each output thereof. Considering now sets each of which is comprised of ten successive cells included in the second image sensor, seven sets $B_1, B_2, \ldots B_7$ can be obtained as shown in FIG. 3. The focus condition can be sought by calculating an individual correlation relation between the image received by ten cells of the first image sensor 12 and the image received by each of seven sets of the second image sensor 14.

Namely, correlation calculations are made with use of correlation functions:

$$Si = \sum_{j=1}^{10} |a_j - b_{i-1+j}| \quad (1)$$
$$(i = 1,2,\ldots,7).$$

For example, if the image detected by the first sensor 12($A_1$) coincides with the image detected by the first set $B_1$ of the second image sensor 14, the correlation function $S_1$ becomes minimum among seven correlation functions $S_1, S_2, \ldots, S_7$. When either one set of the second sensor is found which gives the minimum value with respect to these correlation functions, the distance between two images is determined from the number of the set having been found minimum and a focus condition is detected based on the distance determined. These calculations are carried out by a correlation calculation means 16.

In FIG. 4 showing one scene viewed through a viewfinder of a camera, the focus detection area A is limited to a relatively narrow center area of the field of view of the objective lens. In this case, the image of one person (main object) existing near to the camera and the background image comprised of trees and a hill ar entered into the focus detection area A and, due to this situation, the focus condition detecting device is liable to detect an intermediate distance between the person and the background as a correct distance of the object.

Meanwhile, in the case that a few objects having different distances from the camera respectively are entered into the focus detection area, the main object usually exists at a position nearer than those of the sub objects (background) and, usually, may be one or more persons. And the sub object is usually a background of the person. Considering such an ordinary or typical object as mentioned above, the image of the main object such as a person or persons has a contrast higher than that of the background usually.

In Japanese patent laid open publication No. 126517/1984, there is proposed a focus detecting device in which the focus detection area is divided into a plurality of blocks and a focus detection operation is carried out in every block and the credibility about individual focus detecting operation in every block is checked and the result obtained through the focus detecting operation having the highest credibility is employed as focus detection data.

However, according to this focus detecting device, a long calculation time is needed sine the credibility of focus condition detection has to be checked at every block divided.

SUMMARY OF THE INVENTION

Accordingly, it is an object of the present invention to provide a focus condition detecting device which is able to detect the focus condition of the object in a short time by restriction of the stift range for the correlation calculation.

To accomplish this object, a focus condition detecting device of the present invention is provided with first and second light intensity distribution signal generating means including a first and sec sensor arranged to receive lights having passed through different areas of the exit pupil of objective signals which represent light intensity distributions on the first and second sensor arrays, respectively, and also with signal processing means dividing the first light intensity distribution signal into a plurality of blocks. Calculation means is provided for shifting each of the portion of the first light intensity distribution signal belonging to the respective blocks and the second light intensity distribution signal relative to each other by sequentially changing an amount of shift to calculate correlations therebetween and thereby to find the amount of shift which provides the highest correlation with respect to each of the blocks. Further, this calculation means is controlled by control means in accordance with the amount of shift found to provide the highest correlation through the correlation calculation with use of the portion of the first light intensity distribution signal belonging to one of the blocks so as to restrict the shift range for the succeeding correlation calculation with use of the portion of the first light intensity distribution signal belong to another one of the blocks. A focus condition signal representing the focus condition of the objective lens is generated in accordance with the amount of shift found to provide the highest correlation through each correlation calculation.

According to the focus condition detecting device of the present invention having the above construction, focus condition detection is made possible in a short time due to the restriction of the shift range effected by the control means.

BRIEF DESCRIPTION OF DRAWINGS

The above and other objects and features of the present invention will become apparent from the following description of preferred embodiments of the present invention taken in conjunction with the accompanying drawings wherein.

DESCRIPTION OF PREFERRED EMBODIMENTS

Figure 1:
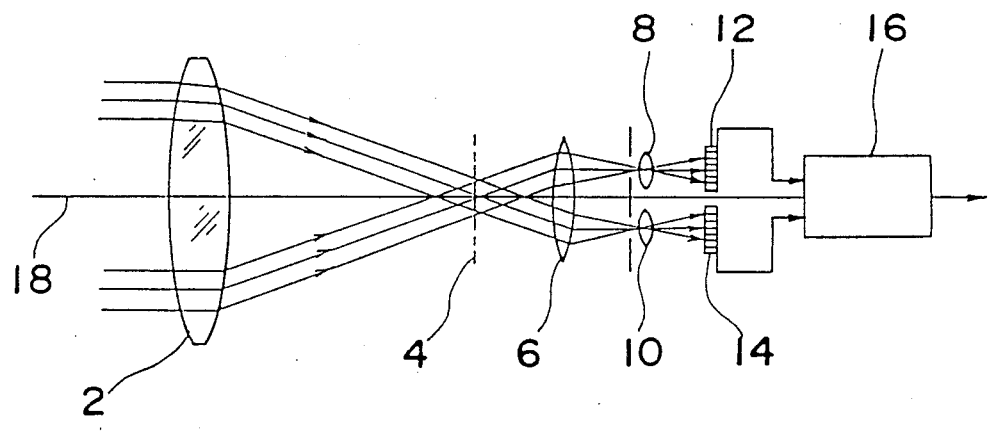
FIG. 1 is an optical system of a typical focus condition detecting device.
Figure 2:
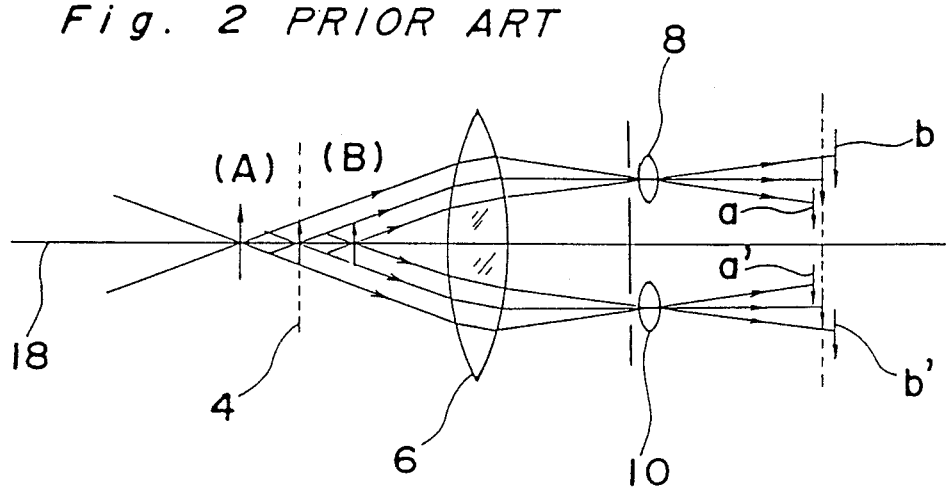
FIG. 2 is an explanative view for showing focus conditions in the optical system of FIG. 1.
Figure 3:
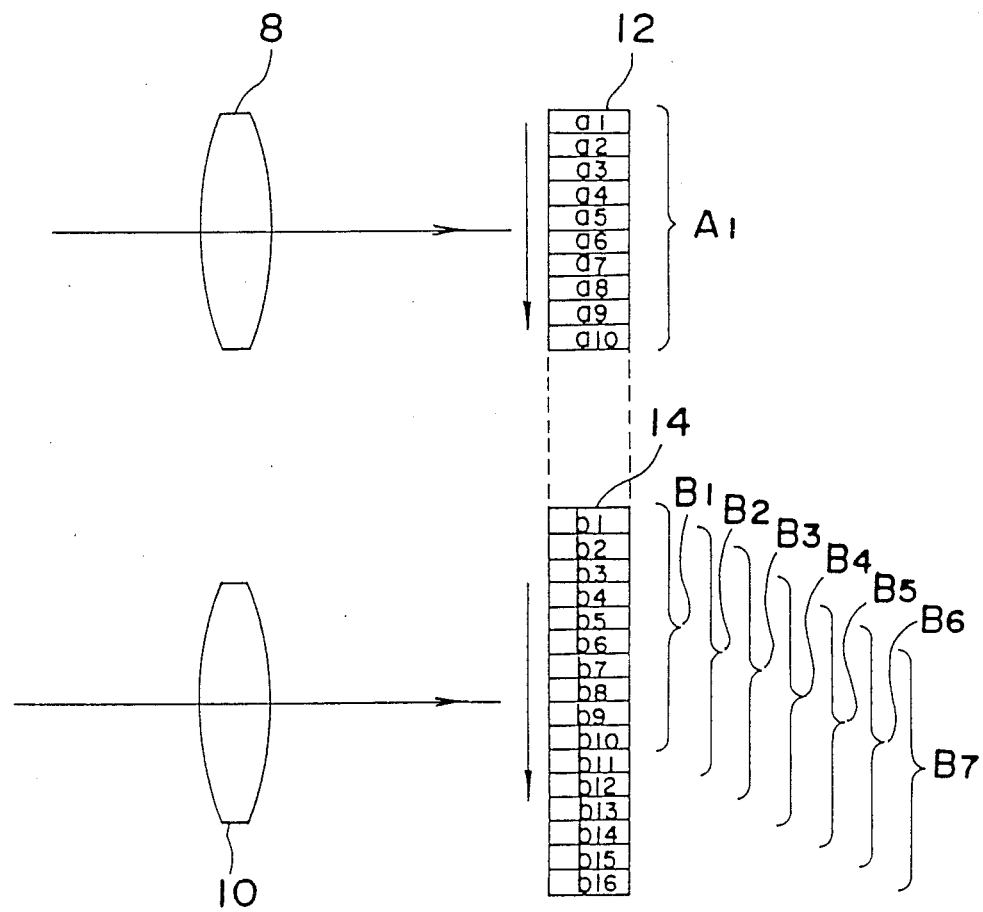
FIG. 3 is an explanative view for showing the manner of calculating the correlation between two image sensors.
Figure 4:
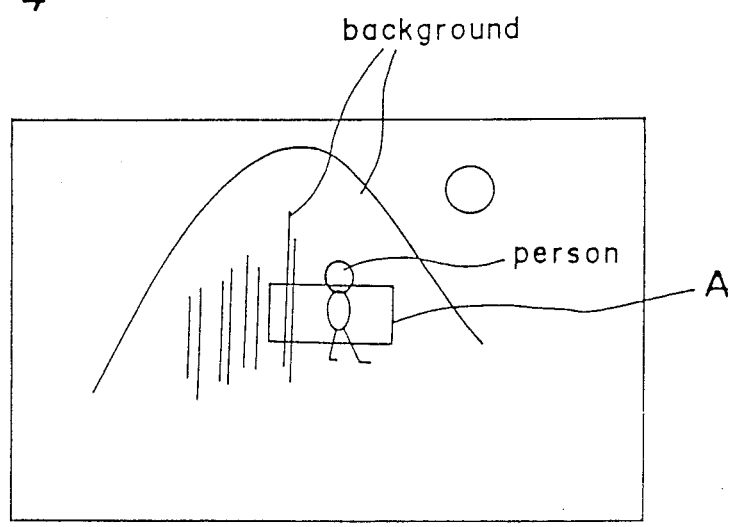
FIG. 4 is an explanative view for showing a scene viewed through a view-finder.
Figure 5:
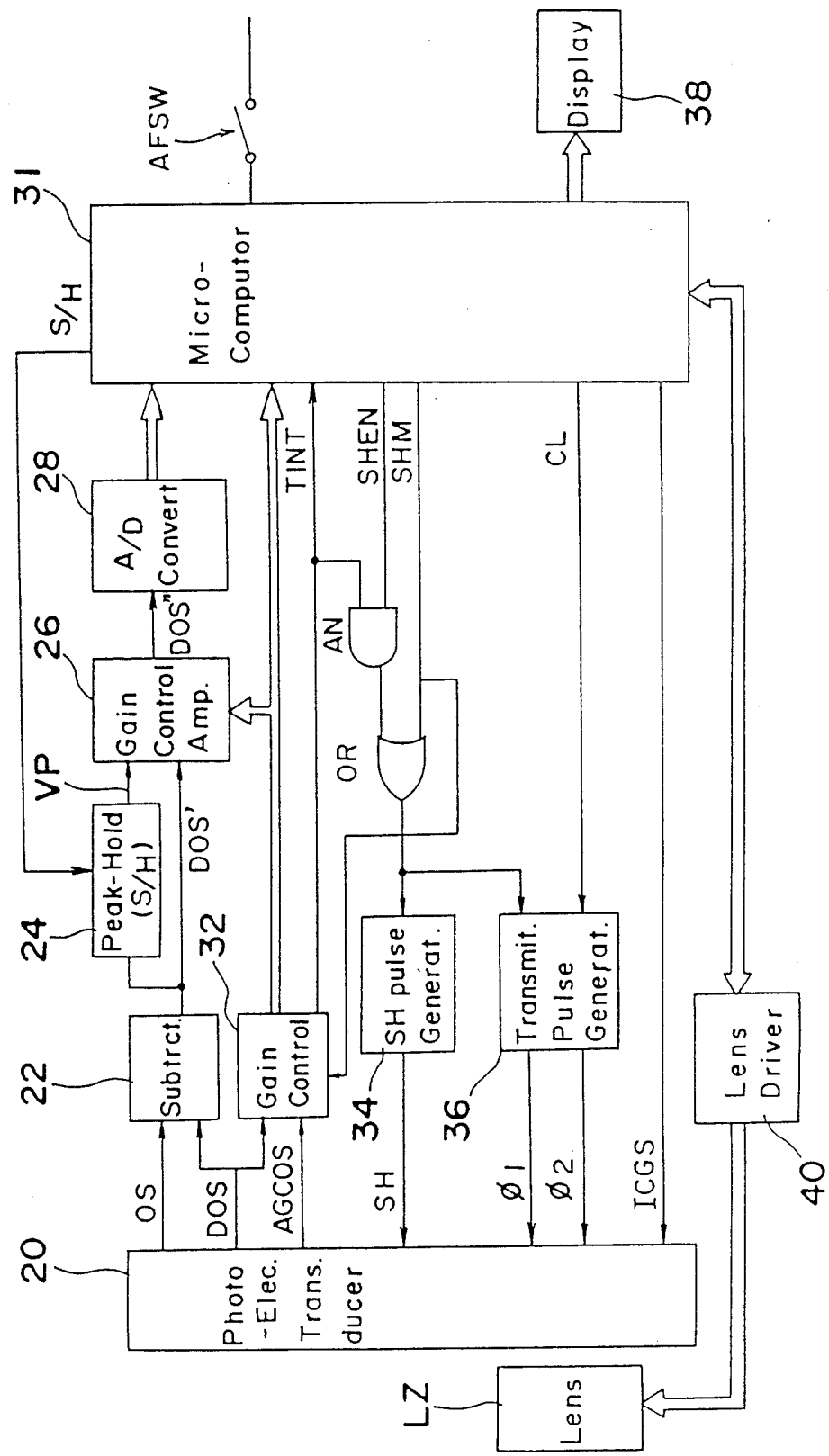
FIG. 5 is a block diagram of a focus condition detecting circuit.
Figure 6:
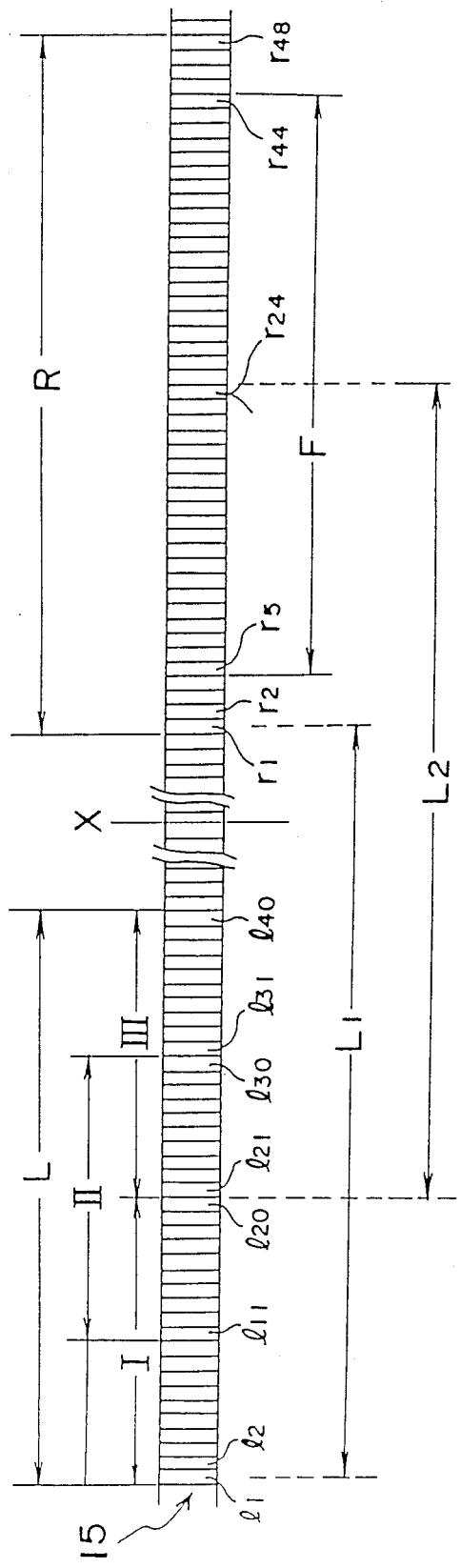
FIG. 6 is an enlarged plan view showing a composition of a line image sensor.

FIG. 5 shows a block diagram of an automatic focusing system enploying a focus condition detecting device of the present invention. Though this block diagram does not include an optical system for focus condition detection, the optical system as shown in FIG. 1 is employed. However, a single line image sensor as shown in FIG. 6 is employed in this automatic focusing system in place of the first and second image sensors 12 and 14 of FIG. 1. In other words the first and second image sensors 12 and 14 are formed with a first and second portions L and R of the single line image sensor 15. The first portion L being comprised of forty picture elements from $l_1$ to $l_{40}$ is defined as a standard portion. The second portion R being comprised of forty eight picture elements from $r_1$ to $r_{48}$ is defined as a reference portion. A center position X is a position at which the optical axis of the objective lens crosses.

In the standard portion L, there are defined first to third blocks I to III being overlapped with each other. These first to third blocks I to III comprise picture elements from $l_1$ to $l_{20}$, from $l_{11}$ to $l_{30}$ and from $l_{21}$ to $l_{40}$, respectively. There is arranged a monitoring photoelectric element (not shown) just above the standard portion L. As shown in FIG. 6, a distance between the left most picture element $l_1$ of the standard portion L and the picture element $r_1$ of the reference portion R being nearest to the crossing position X of the optical axis is defined as "$L_1$".

Further, this optical system employed is designed so that an image having a light intensity distribution equal to that of an image formed on the second block II of the standard portion L might be formed in a range defined between $r_5$ and $r_{44}$ of the reference portion R when the objective lens of the camera is in-focus with respect to an object, namely an object image is focused on the predetermined focal plane thereby. Accordingly, the range defined from the picture element $r_5$ to the picture element $r_{44}$ is defined as "in-focus block" F. And, a distance from the center picture element $l_{21}$ of the standard portion L to the center picture element $r_{24}$ of the in-focus block F is defined as "image distance $L_2$ of in-focus state".

Returning to FIG. 5, a control circuit (31) constituted by a micro-computer starts a focus condition detecting operation when a shutter release button (not shown) is pushed down by a half stroke thereof while a switch for the focus condition detecting mode is turned ON.

At first, an integration clear pulse signal ICGS is outputted from the control circuit 31 to a CCD image sensor provided in a photo-electric transducer circuit (20) and having the arrangement as shown in FIG. 6. Due to this signal, all of picture elements of the CCD image sensor are reset to initial states and an output AGCOS of a brightness monitoring circuit (not shown) housed in the CCD image sensor to receive an output of the monitoring photo-electric element referred to above is set up to the level of the voltage of the power source. At the same time, the control circuit (31) outputs a permission signal SHEN of "High" level for permitting a shift pulse generator 34 to generate a shift pulse. As soon as the integration clear signal ICGS disappears, integration of photocurrent is started in every element of the CCD image sensor. At the same time, while the output AGCOS of the brightness monitoring circuit in the photo-electric transducer circuit begins to drop with a velocity corresponding to the intensity of light incident on the monitoring photo-electric element, a reference signal DOS generated by a reference signal generating circuit (not shown) provided in the photoelectric transducer circuit (20) is kept at a constant reference level. A gain control circuit (32) compares the output AGCOS with the reference signal DOS and controls a gain of a differential amplifier (26) of a gain variable type according to an amount of drop of the output AGCOS relative to the reference level DOS within a predetermined time interval (for instance, it is set to 100 m sec upon the focus condition detecting operation). The gain control circuit (32) output signal TINT of "High" level as soon as it detects the AGCOS signal has dropped to a level equal to or lower than a predetermined level against the reference level DOS within the predetermined time interval starting from the disappearance of the integration clear signal ICGS. The signal TINT is input to a shift pulse generating circuit (34) via an AND gate (AN) and an OR gate (OR) and the shift pulse generating circuit (34) outputs a shift pulse SH in response thereto. When the shift pulse SH is input to the photo-electric transducer (20), the integration operation of photo-current by each light sensing element of the CCD image sensor is stopped and, then, charges accumulated in each light sensing element and corresponding to integrated values of the photo-current are transmitted parallel to cells in a shift register provided in the CCD image sensor so as to correspond one to one to the light sensing elements of the CCD image sensor.

Further, a transmission pulse generating circuit (36) outputs two-sensor driving pulses $\phi 1$ and $\phi 2$ having phases different from each other by 180° in a manner synchronized with clock pulses CL from the control circuit (31). The CCD image sensor in the photo-electric transducer circuit (20) outputs signals OS forming image signals respectively by discharging a charge of each cell of the CCD shift register serially in the order of alignment of elements. This OS signal has a higher voltage as an intensity of incident light to a corresponding element is weaker. A subtraction circuit (22) subtracts OS signal from DOS signal and outputs the difference (DOS-OS) as a picture element signal.

On the contrary to the above, if the predetermined time interval has elapsed without receipt of a TINT signal after the disappearance of ICGS signal, the control circuit (31) outputs an instruction signal SHM for generating a shift pulse of "High" level. Therefore, in this case, the shift pulse generating circuit (34) generates a shift pulse SH in response to this instruction signal SHM.

Further, the control circuit (31) outputs a sample-hold signal S/H when element signals from seventh to tenth element are outputted. This area of the CCD image sensor corresponding to these elements is covered with an aluminum mask, so that these elements integrate only dark currents inherent to the CCD image sensor. Namely, these picture elements are shutted from the incident light. A peak hold circuit (24), when the sample hold signal S/H is applied thereto, holds a difference between the reference signal DOS and one of output signals from the seventh to tenth elements covered with the aluminum mask. Thereafter, the difference VP and element signal DOS' are input to the gain variable amplifier (26). That gain variable amplifier (26) amplifies a difference (VP-DOS') between VP and DOS' with a gain controlled by the gain control circuit (32). The amplified signal DOS" is converted from analogue data to digital data by an A/D converter (28) and digital data are applied to the control circuit (31) as picture element signal data. Though the A/D conversion by the A/D converter is done in a unit of 8 bits, data are transmitted to the control circuit in each lump of top four bits and bottom four bits.

The control circuit (31) stores these picture element signal data in an internal memory thereof and, when all of element signal data have been stored therein, processes those data according to programs set therein to calculate a defocus amount and a direction of defocus, to display these data on a display (38) and to drive a lens driving device (40) according to the defocus amount and the direction thereof in order for auto-focusing adjustment of the objective lens.

Data with respect to the focus condition of the objective lens obtained by the calculation operation of the control circuit 31 are a defocus amount and defocus direction. Based on these data, a driving amount and direction of the objective lens driven by the lens driving device 40 are determined. While the lens driving device 40 drives the objective lens according to the driving amount and direction, it outputs signals corresponding to driving amounts of the objective lens. The control circuit 31 detects an actual driving amount from the signals and, when it becomes equal to the determined driving amount, outputs a signal for stopping the lens driving to the lens driving device.

A switch AFSW is provided to input a start signal for starting the detection of defocus amount and the automatic focus adjustment due to the defocus detection.

Figure 7:
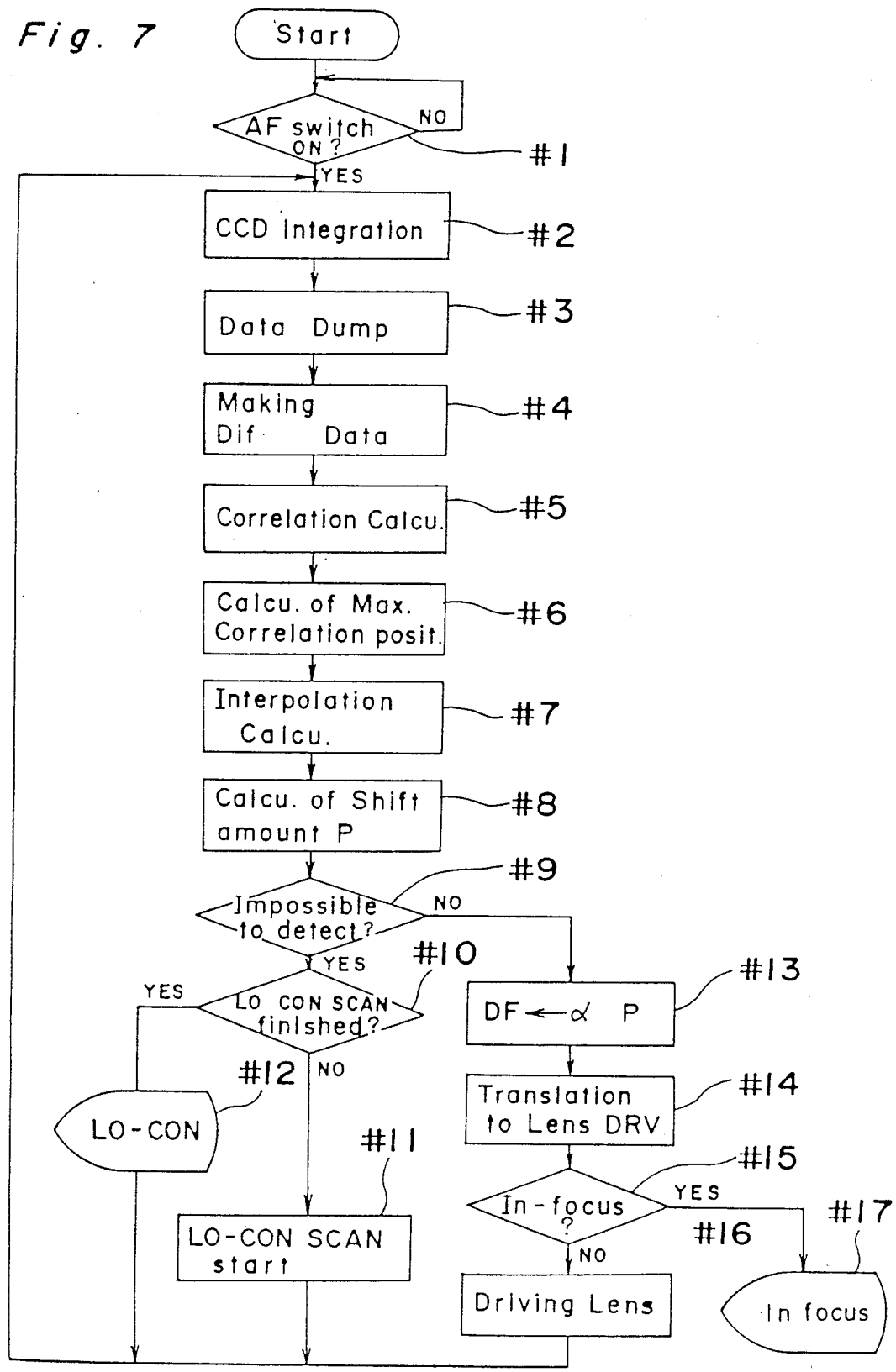
FIG. 7 is a flow-chart showing a main routine program for focus condition detection according to the present invention.

FIG. 7 shows a flow-chart of a main routine program to be executed by the control circuit.

The program is started when electric power is supplied from the battery loaded in the camera to the control circuit by switching the power switch (not shown) ON.

The control circuit waits until the AF switch (AFSW) is switched ON at step #1 and, when the AF switch has been switched ON, indicates to start an integration operation by the CCD image sensor at step #2.

When the integration operation has been completed in response to the shift pulse SH, output signals from picture elements of the image sensor are successively outputted as image signals (OS) at data dump step #3. Each image signal is converted to a picture element signal by the substracting circuit 22 and, then, converted to digital data by the A/D converter 28 after having been amplified with a gain corresponding to the brightness of the object.

At step #4, differential data are calculated from picture element signals in order to remove low-frequency signal components contained in picture element signals.

Then, the correlation calculation between the standard L and reference portion R are made with use of the differential data at step #5 and, at step #6, a range of the reference portion R showing the highest correlation is found out.

Further, an interpolation calculation is carried out in order to obtain a shift amount of image distance having a higher precision at step #7 and, then, the shift amount P of image distance is calculated at step #8. At step #9, it is decided whether the shift amount P obtained at step #9 has a reasonable credibility or not, i.e., whether or not a reasonable focus condition detection is possible or not. If it is decided that a reasonable focus condition detection is impossible at step #9, it is decided whether a low-contrast scanning has been completed or not. This low-contrast scanning is provided as a countermeasure against such a case that the defocus amount is too large to perform the focus condition detection. In this operation, the objective lens is driven in one axial direction while repeating focus condition detections and, when the defocus amount detected falls within a range wherein the focus condition detection can be done exactly, the objective lens is driven to its in-focus position based on the shift amount of image distance having been detected at that time.

If the low-contrast scanning has completed already at step #10, the display device is operated to display "Low-Contrast" at step #12 and the program returns to step #2. If the low-contrast scanning has not completed yet, the low-contrast scanning is started at step #11 and, then, the program returns to step #2.

If it is decided that the focus condition detection is possible at step #9, the shift amount of image distance is transformed into the defocus amount DF at step #13 and, further, the defocus amount is transformed to the lens driving amount DF at step #14. At step #15, it is decided whether the defocus amount or driving amount having been sought falls within a predetermined in-focus range or not. If it falls within the in-focus range, the display device is operated to display "In-Focus" at step #17.

If it is not in-focus, the objective lens is driven according to the driving amount sought at step #14 and, then, the program returns to step #2.

Since these steps mentioned above are disclosed more precisely in a copending U.S. patent application Ser. No. 570,012 filed on Jan. 10, 1984 and assigned to the same assignee as the present application, only portions related to the present invention will be explained in detail hereinafter.

Figure 8A:
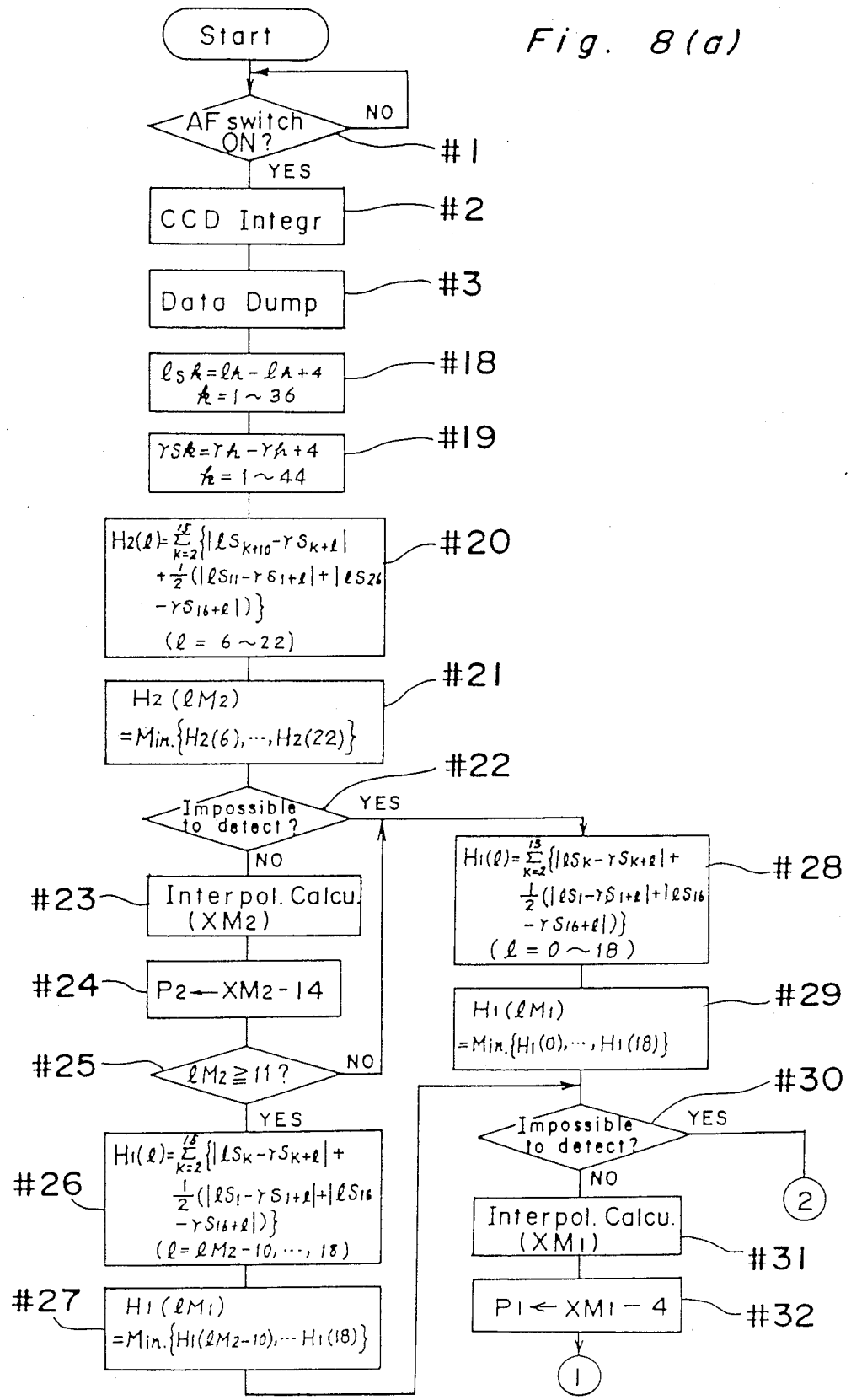
FIGS. 8(a) and 8(b) are flow-charts showing the first preferred embodiment of the present invention.
Figure 8B:
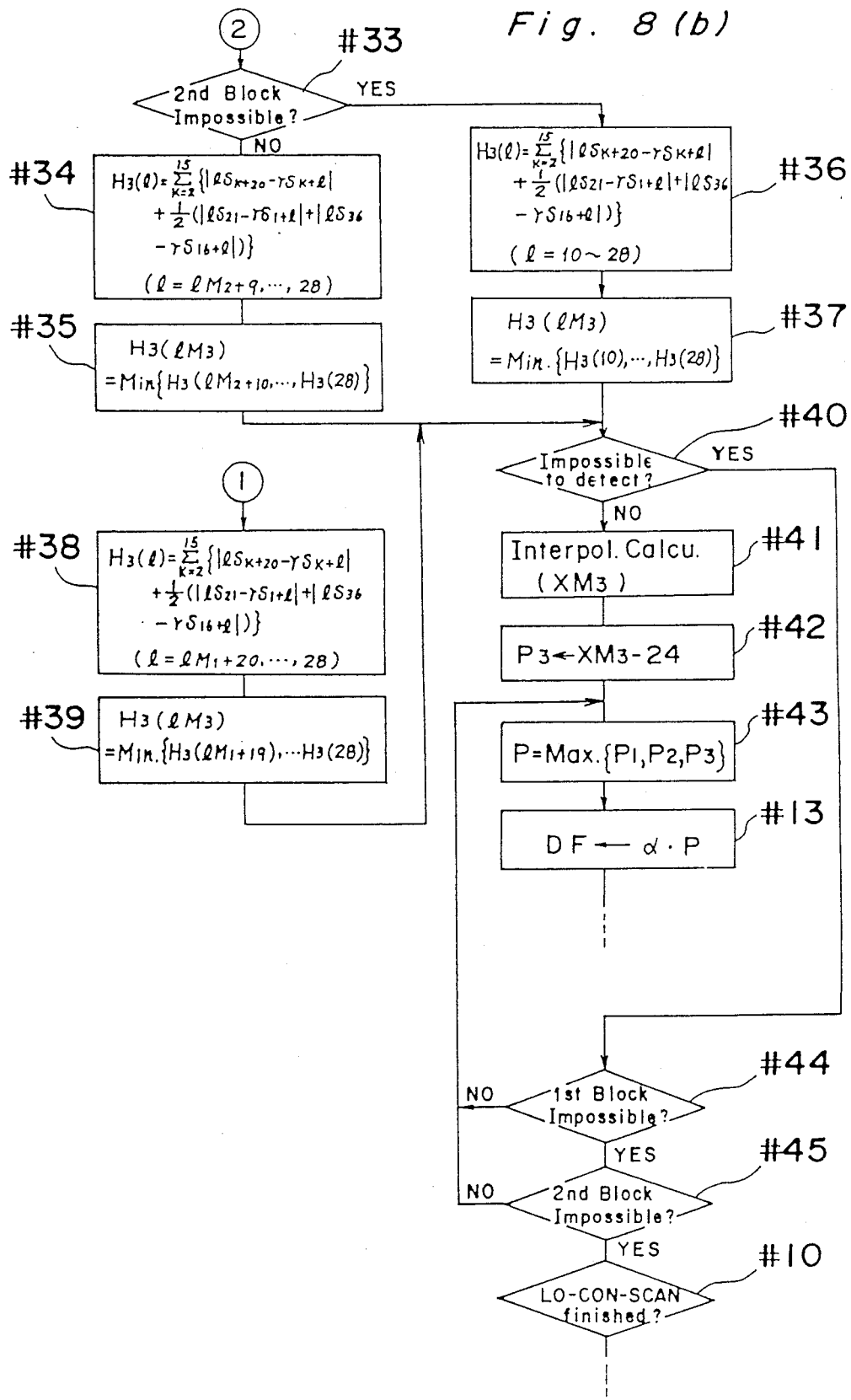

FIGS. 8(a) and 8(b) show a flow-chart of the focus condition detection program according to the preferred embodiment of the present invention.

According to the preferred embodiment, the standard portion is devided to have three blocks, a shift amount of image distance is calculated with respect to every block, a shift amount of image distance corresponding to the rearmost focus condition is chosen as a correct value among three shift amounts obtained and the objective lens is driven according to the shift amount chosen.

As mentioned already with respect to FIG. 6, three blocks I, II and III are defined in the standard portion L of the CCD image sensor. Detection ranges wherein shift amounts can be detected with use of these three blocks are set so as to overlap with each other as is clearly shown in FIG. 9 and a following table.

Now returning back to FIG. 8(a), when the AF switch is turned on, the program proceeds to step #18 after passing steps #1 to #3. At step #18, differential data $l_{sk}$ are calculated with use of every four picture element signals ($l_{sk} = l_k - l_{k+4}$) obtained by picture elements of the standard portion. Also, differential data $r_{sk}$ ($= r_k - r_{k+4}$) are calculated with respect to the reference portion R at step #19. These pre-processing of picture element signals are done in order to remove low-frequency error factors accompanied by spatial frequency components of the light intensity distributions on the standard and reference portions (L and R) which are caused by errors from the specification of the optical system for detecting the focus condition. Since this pre-processing is disclosed in detail in the above mentioned copending U.S. patent application Ser. No. 570,012, further explanation thereabout is omitted.

Figure 9:
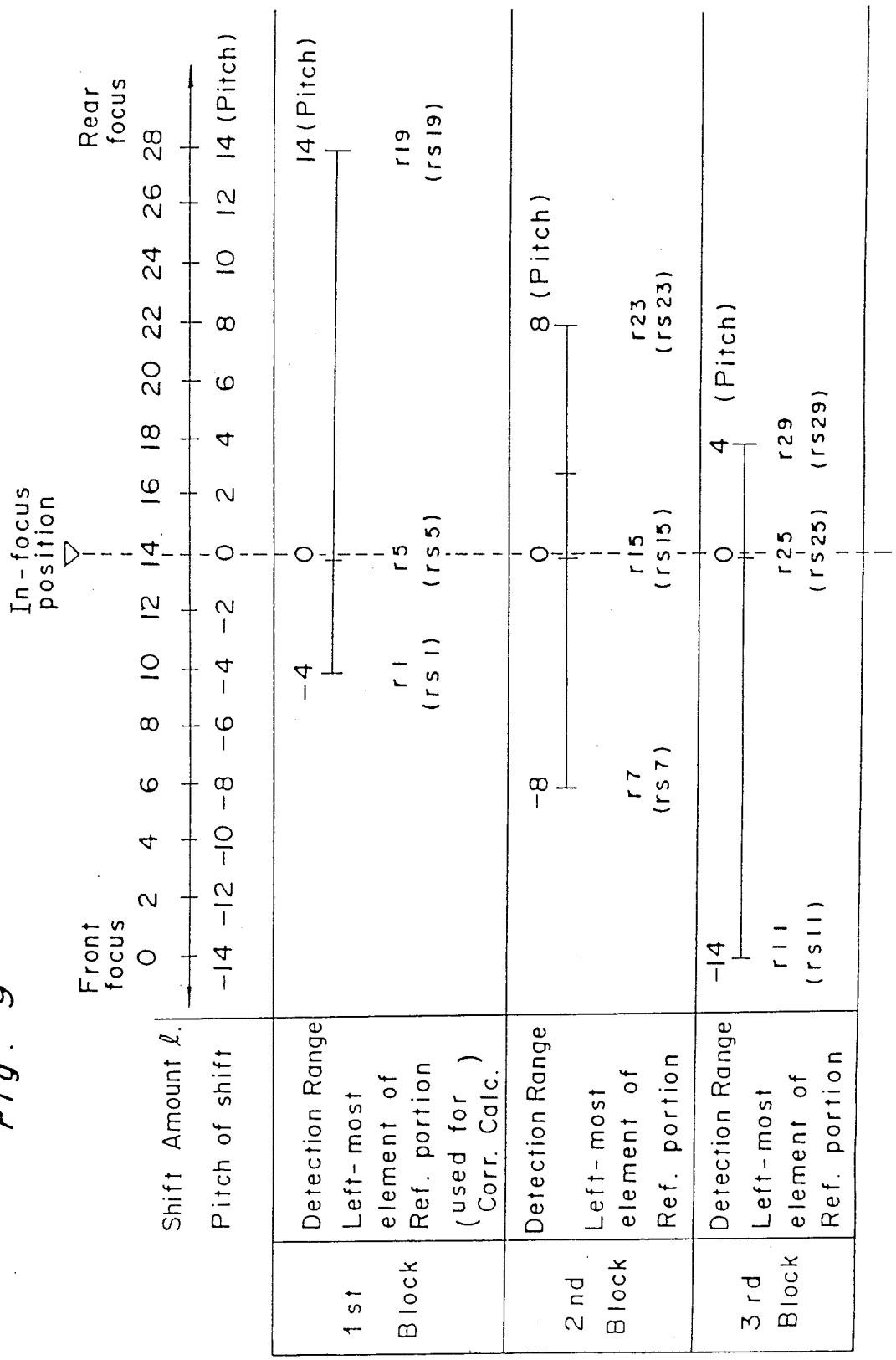
FIG. 9 is a table for showing the composition of the line image sensor.

Next, at step #20, the correlation calculation is made with use of the differential data belonging to the second block II of the standard portion(L) and the differential data belonging to the range of the reference portion(R) defined from (−8)th to (+8)th pitch when seen from the center in-focus position, respectively (FIG. 9). In the equation for the correlation calculation, 1 represents a shift amount by which the differential data belonging to the second block II of the standard portion (L) are shifted relative to the differential data belonging to the above range of the reference portion (R).

At step #21, there is sought with use of correlation functions obtained at step #20 position (, i.e., a shift amount) $lM_2$ on the reference portion(R), which gives the highest correlation.

It is decided whether results obtained at steps #20 and #21 have a high credibility or not, namely whether the focus condition detection is possible or not. If decided possible, an interpolation calculation is made to seek for a position $MX_2$ more accurate than the position $lM_2$ at step #23 and, then, the deviation amount $P_2$ of image distance is calculated from the position $XM_2$.

At step #25, before executing a correlation calculation with use of the first block I, it is decided whether the position $lM_2$ which gives the highest correlation with respect to the second block II locates within the range which permits the correlation calculation with use of the first block I. The position of $l=11$ is the front most focus side end position which permits the correlation calculation with use of the first block I.

If $lM_2 < 11$, the program proceeds to step #28 in order to execute correlation calculation with use of the full detection range set for the first block I and defined from (−4)th to (+14)th pitch since this fact suggests that the position $lM_2$ obtained by the correlation calculation of step #20 locates on the front focus side with respect to the detection range set for the first block I. And, at step #29, a position $lM_1$ which gives the highest correlation with respect to the first block I is found.

If it is decided at step #22 that the focus condition detection is impossible, the program also proceeds to steps #28 and #29.

TABLE

|  |  | Area of Pic Element | Diff. Data | Left Most Elem. for Corr. Calc. | Dect. Area for Image Dist. Error (Max) |
|---|---|---|---|---|---|
| Stand. Port. (L) | First Block (I) | $l_1 \sim l_{20}$ | $lS_1 \sim lS_{16}$ | $\gamma_5(\gamma S_5)$ | −4~14 pitch |
|  | Second Block (II) | $l_{11} \sim l_{30}$ | $lS_{11} \sim lS_{26}$ | $\gamma_{15}(\gamma S_{15})$ | −8~8 pitch |
|  | Third Block (III) | $l_{21} \sim l_{40}$ | $lS_{21} \sim lS_{36}$ | $\gamma_{25}(\gamma S_{25})$ | −14~4 pitch |
| Ref. Port. (R) | All | $\gamma_1 \sim \gamma_{48}$ | $\gamma S_1 \sim \gamma S_{44}$ |  |  |

If it is decided at step #25 that lM$_2$ is equal to or larger than eleven (lM$_2 \geq 11$), the program proceeds to steps #26 and #27.

In this case, the correlation calculation is made with use of a portion of the detection range set for the first block I and defined from (lM$_2$−10)th pitch to 18th pitch in order to shorten a calculation time needed for the correlation calculation with use of the first block I by omitting correlation calculation which might give a position locating on the front focus side with respect to the position indicated by the lM$_2$ having been obtained at step #21. And, at step #27, a position lM$_1$ which gives the highest correlation is calculated therefrom.

At step #30, it is decided whether the focus condition detection is possible with respect to the first block I or not. If decided possible, the program proceeds to steps #31 and #32 in order to calculate a deiation amount P$_1$ of image distance with a high precision by executing an interpolation calculation.

Then, the program proceeds to step #38 of FIG. 8(b) in order to execute the correlation calculation with use of the third block III. Since the position lM$_1$ obtained by the correlation calculation with use of the first block I locates within the detection range set for the third block III or rear focus side thereof, a range which is on the front focus side than the position lM$_1$ having been found out by the correlation calculation with use of the first block I is omitted from the correlation calculation with use of the third block III in order to shorten a calculation time needed therefor.

Although not shown in FIGS. 8(a) and 8(b), if lM$_1 \geq 8$, the program jumps to step #44 by skipping steps #38 and #39 since in this case there is no range which permits the correlation calculation with use of the third block III.

If it is decided at step #30 of FIG. 8(a) that the correlation calculation with use of the first block I is impossible, the program proceeds to step #33 of FIG. 8(b) to decide whether the correlation calculation with use of the second block II was possible or not. If decided possible, the program proceeds to steps #34 and #35 in order to execute the correlation calculation with use of the third block III. Also, in this case, a range of the third block III in which is on the front focus side of the position LM$_2$ having been obtained by the correlation calculation with use of the second block II is omitted from the correlation calculation with use of the third block III.

Although not shown in FIGS. 8(a) and 8(b), if lM$_2 > 18$, namely there is no available range for the correlation calculation with use of the third block III, the program jumps to step #44 without executing steps #34 and #35.

If it is decided at step #33 that the focus detection is impossible with use of the second block II, the program proceeds to step #36 in order to execute the correlation calculation over the full range of the reference portion R set for the third block III and, at step #37, a position lM$_3$ which gives the highest correlation with respect to the third block III is calculated.

Next, it is decided at step #40 whether the correlation calculation with use of the third block (III) has a reasonable credibility or not. If it has a reasonable credibility, the program proceeds to step #41 to execute an interpolation calculation in order to obtain a deviation amount P$_3$ of image distance with a high precision due to the interpolation calculation. At next step #43, the maximum value of three deviation amounts P$_1$, P$_2$, P$_3$ of image distance which gives the rear most focus position is chosen as the most probable deviation amount P of image distance. If either of these values is impossible to calculate, the maximum value is chosen from the rest values.

After that, the program returns to step #13 of FIG. 7 in order to calculate a defocus amount DF based on the most probable deviation amount P of image distance.

If it is decided that the correlation calculation has not a reasonable credibility, the program proceeds to step #44 in order to decide whether the correlation calculation with use of the first block I has a reasonable credibility or not. Then, at step #45, it is also decided whether the correlation calculation with use of the second block II has a reasonable credibility or not.

If it is decided at either one of steps #44 and #45 that the correlation calculation has a reasonable credibility, the program proceeds to step #43 to calculate the most probable deviation amount P of image distance.

If all correlation calculations with use of the first, second and third blocks have not reasonable credibilities, the program proceeds to step #10 of FIG. 7 to execute the low-contrast scanning.

It is desirable to calculate correlation functions Hn(lmin−1)) and Hn(lmin+1) adjacent to the minimum correlation function Hn(lmin) before executing the interpolation calculation at step #23, #31 or #41, wherein (lmin−1) represents (lM$_1$−1), (lM$_2$−1) and (lM$_3$−1) while (lmin−1) represents (lM$_1$+1), (lM$_2$+1) and (l$_{M3}$+1). This enables to calculate a focus position in a range defined from (lmin−0.5) pitch to (lmin+0.5) pitch.

Figure 10:
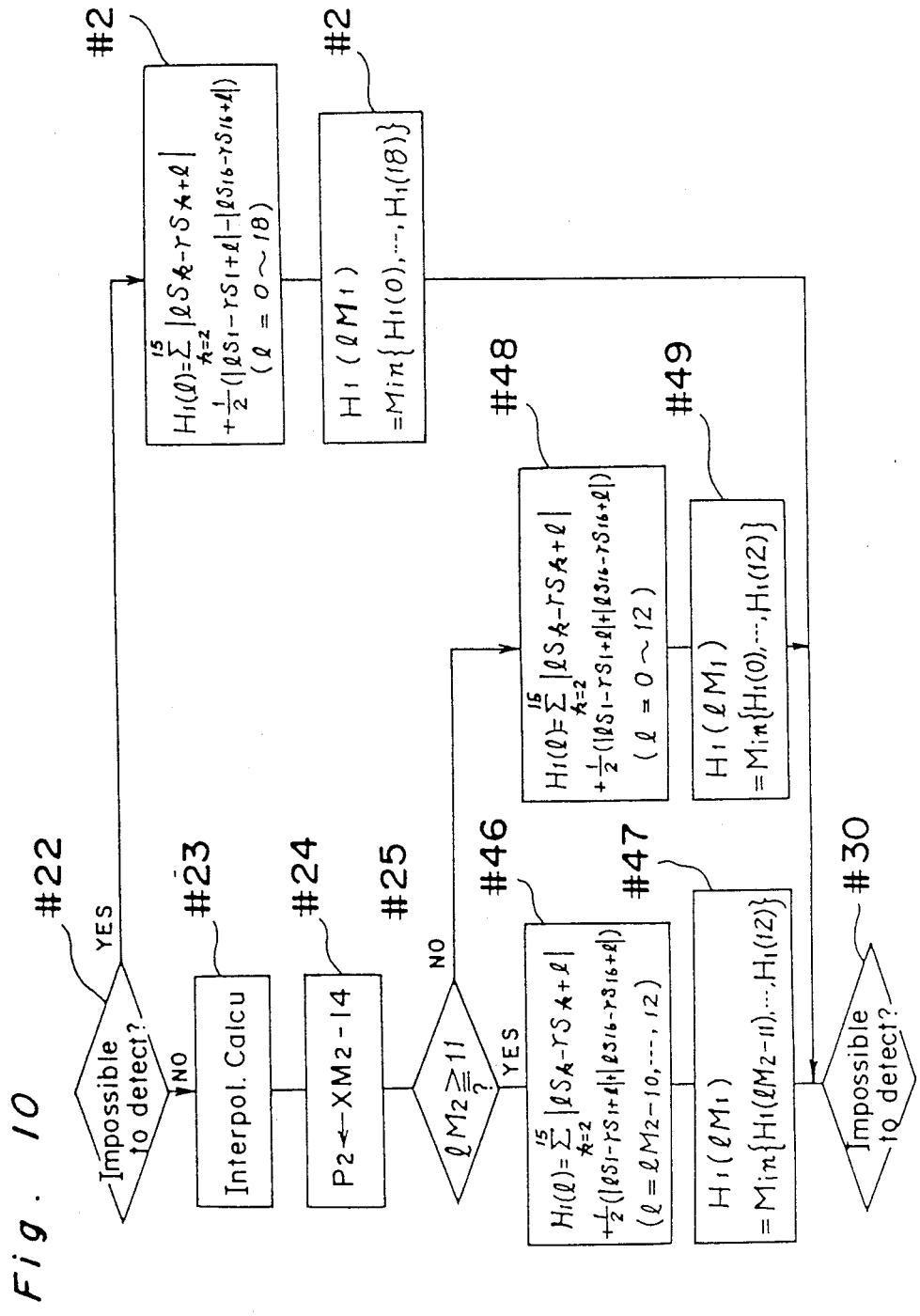
FIG. 10 is a flow-chart for showing the second preferred embodiment of the present invention.

FIG. 10 shows a flow-chart of the second preferred embodiment of the present invention. In this embodiment, the detection range of the first block I is changed according to the possibility of focus condition detection with use of the second block II. If the focus condition detection with use of the second block II is impossible, the detection range of the first block I is set at a wide range in order to improve the probability of detection as shown at step #28 since a focus position might be shifted from the normal infocus position considerably in such a case as mentioned above. On the contrary to the above, if it is possible to detect a focus position with use of the second block II, the detection range of the first block I is narrowed at step #46 or #48 in order to reduce the calculation time. Although in consideration of the objects located at far and near distances the detection range in this case is set so as to include a range which is on the rear focus side with respect to a shift amount lM$_2$ having been sought with use of the second block II, too, it is not necessary to set such a wide detection range as set in the case that the focus condition detection with use of the second block II is impossible. Actually, the correlation calculation is terminated at l=12.

Figure 11:
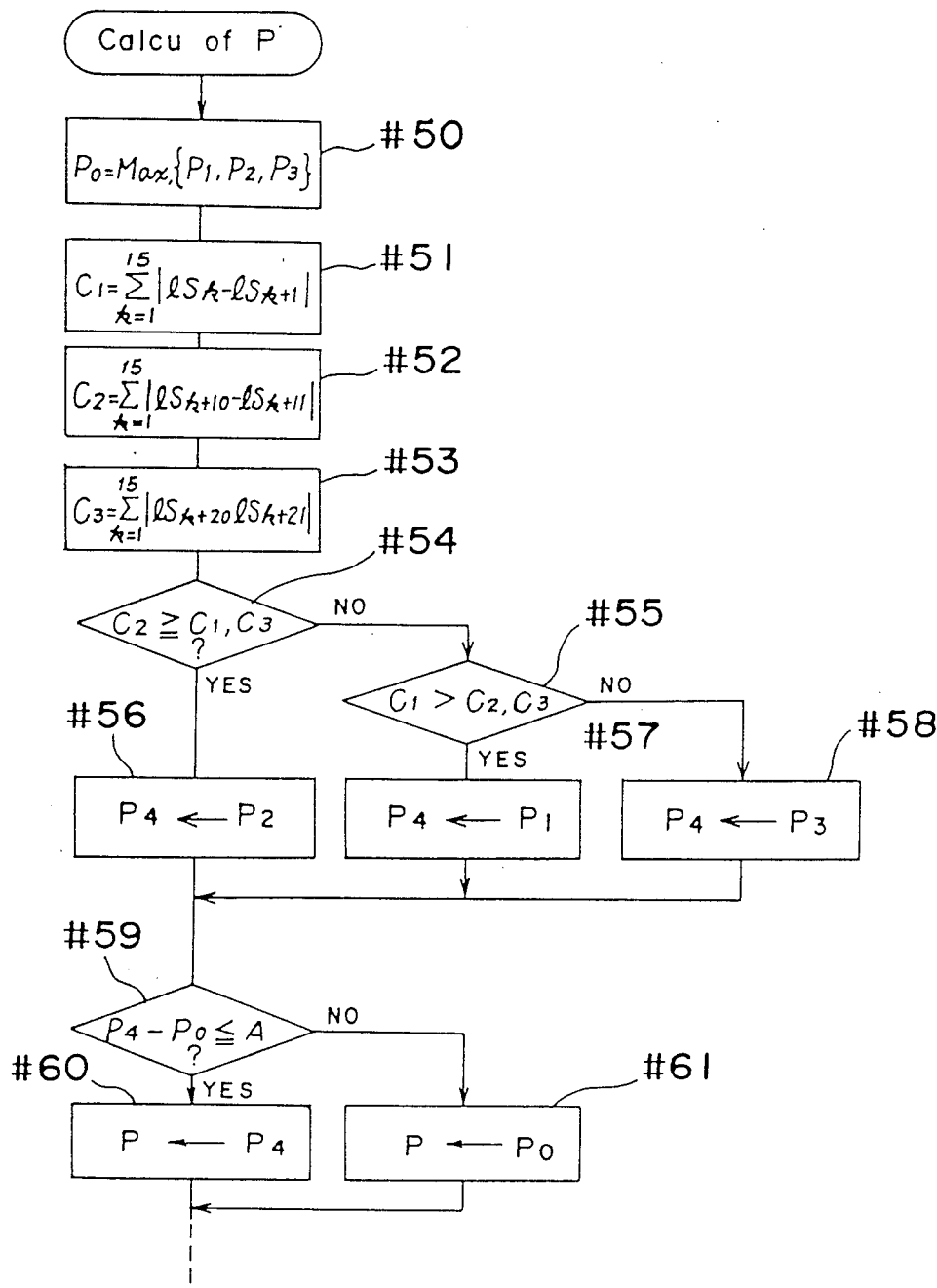
FIG. 11 is a flow-chart for showing the third preferred embodiment of the present invention.

FIG. 11 shows a flow-chart of the third preferred embodiment of the present invention in which the method for determining the most probable value P of the deviation amount of image distance is changed from that of the first preferred embodiment shown at step #43 of FIG. 8(b).

As explained already, the deviation amount of image distance indicating the rear most focus position is chosen among those obtained in the first preferred embodiment. However, there is a possibility that the detection precision is lowered since an error contained in the deviation amount of image distance obtained is enlarged when the contrast of an object becomes low in such a case of an object having a flat surface.

This preferred embodiment is considered as a countermeasure against the problem just mentioned above. According to this embodiment, the maximum value chosen among deviation amounts ($P_1$, $P_2$, $P_3$) of image distance is compared with the deviation amount $P_4$ of image distance which is obtained with use of the block with which the highest contrast is detected among blocks I to III and if the difference between Max ($P_1$, $P_2$, $P_3$) and $P_4$ is smaller than or equal to a predetermined value, $P_4$ is employed as the most probable value of the shift amount of image distance.

As shown in FIG. 11, the maximum value $P_0$ is chosen among deviation amounts $P_1$, $P_2$ and $P_3$ of image distance obtained with use of the first, second and third blocks at step #50. Next, at steps #51, #52 and #53, contrast values $C_1$, $C_2$ and $C_3$ of contrast on the first to third blocks I to III are calculated with use of differential data (lsk), respectively. Then, these contrast values are compared with each other to find the maximum value at steps #54 and #55 and the deviation amount of image distance obtained from the block having the maximum contrast is chosen as $P_4$ at step #56, #57 or #58. Then, a difference between $P_0$ and $P_4$ is compared with the predetermined value A at step #59 and if the difference ($P_4-P_0$) is smaller than or equal to A, $P_4$ is set as the most probable deviation amount P of image distance at step #60. If it is larger than A, $P_0$ {=Max ($P_1$, $P_2$, $P_3$)} is set as the most probable shift amount P.

Figure 12:
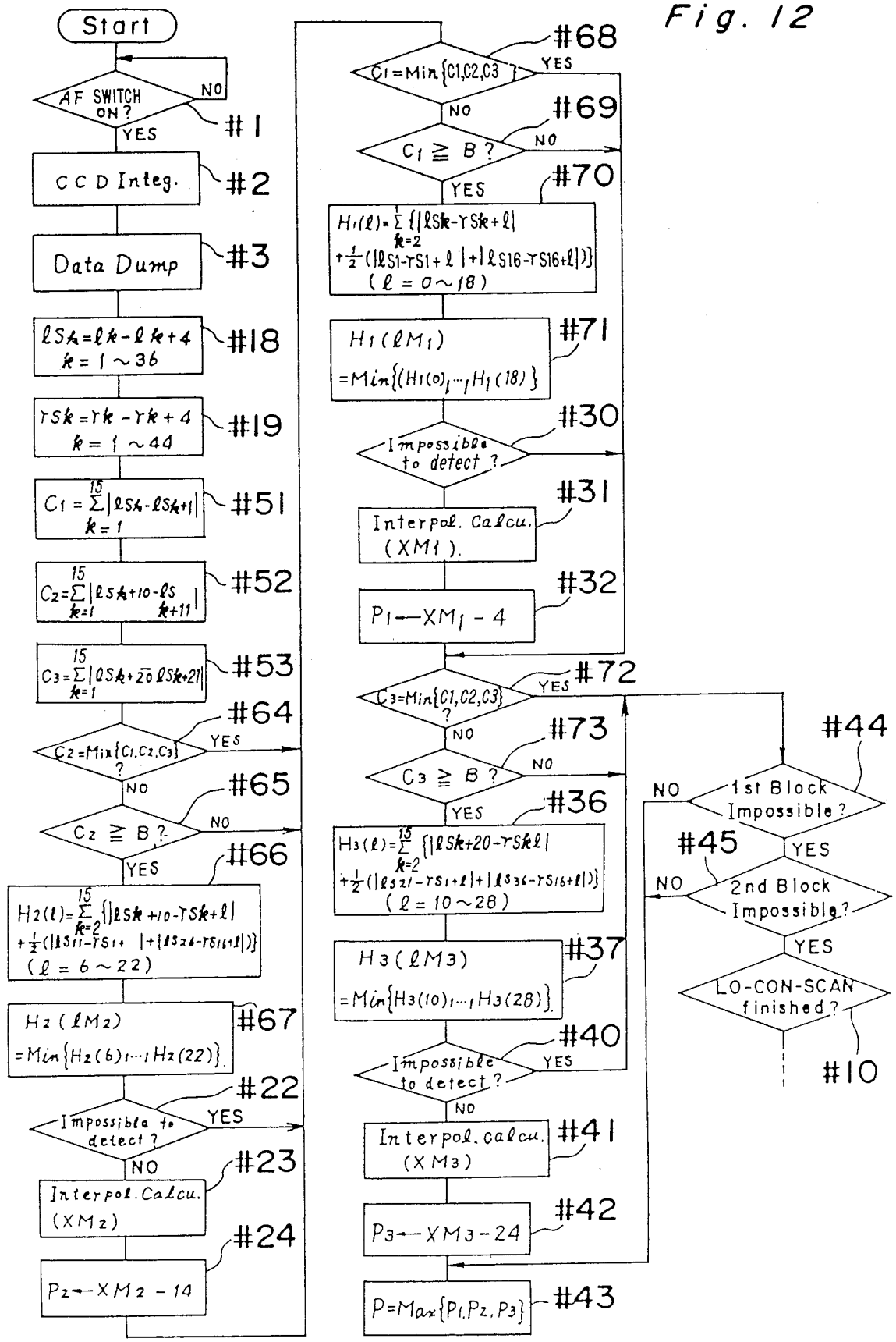
FIG. 12 is a flow-chart for showing the fourth preferred embodiment of the present invention.

FIG. 12 shows a flow-chart of the fourth preferred embodiment of the present invention. This embodiment is intended to shorten a calculation time necessary for the focus condition detection calculation. In order for that to occur the correlation calculation is done with the use of two blocks among three blocks, the two blocks having higher contrasts than the remaining one block. Further, if the contrast value of every block is smaller than a predetermined value, the correlation calculation is prohibited since the credibility thereof is considered too low to do it.

As shown in FIG. 12, steps from #1 to #19 are the same to those of FIG. 8(a) Accordingly, explanations about these steps are omitted.

Next, as shown in FIG. 12 at steps #51, #52, #53, contrast values $C_1$, $C_2$ and $C_3$ of the contrasts on the first to third blocks are calculated, respectively. At step #64, it is decided whether the contrast value $C_2$ is minimum among contrast values ($C_1$, $C_2$, $C_3$) or not. If it is minimum, the correlation calculation with use of the second block is omitted and the program proceeds to step #68 in order to execute the correlation calculation with use of the first block I.

If $C_2$ is not minimum, it is decided at step #65 whether $C_2$ is equal to or larger than a predetermined limit value B of contrast or not.

If $C_2$ is smaller than B, the program proceeds to step #68 to execute the correlation calculation with use of the first block I.

If $C_2$ is equal to or larger than B, the correlation calculation with use of the second block II is done at step #66 and a position (shift amount l) which gives the maximum correlation is found out at step #67. At next step #22, it is decided whether the credibility of the correlation calculation is high enough for determining a focus condition or not, namely the focus condition detection is possible or not.

If it is decided that the focus condition detection is possible, an interpolation calculation for obtaining a more accurate correlation position $XM_2$ is done at step #23 and, at step #24, a deviation amount $P_2$ of image distance is calculated with respect to the second block.

Then, the program proceeds to step #68 and #69 to decide whether $C_1$ is minimum among $C_1$, $C_2$ and $C_3$ or not and to decide whether $C_1$ is equal to or larger than B if $C_1$ is not minimum. If either one condition is not satisfied, the correlation calculation with the use of the first block I is omitted and the program jumps to step #72 to execute the correlation calculation with use of the third block III.

If both conditions are satisfied, the correlation calculation with use of the first block I is executed at steps #70 and #71 and it is decided at step #30 whether the focus condition detection is possible or not. If possible, an interpolation calculation for calculating a more accurate correlation position $XM_1$ is done at step #31 and then a deviation amount $P_1$ of image distance is calculated at step #32 with respect to the first block I.

Next, the program proceeds to step #72 to execute the correlation calculation with use of the third block III. If it is decided to be impossible at step #30, the program also proceeds to step #72.

Then, the program proceeds to step #68 in order to execute the correlation calculation with use of the first block I. At step #68, it is decided whether the contrast $C_1$ is minimum or not. If it is not, the contrast $C_1$ is compared with the predetermined value B at step #69.

If either one condition is not satisfied at step #68 or step #69, the program jumps to step #72 in order to execute the correlation calculation with the third block III without executing the correlation calculation with use of the first block I.

If both conditions of steps #68 and #69 are satisfied, the program proceeds to step #70 in order to execute the correlation calculation with use of the full range of the first block I. And at step #71 the maximum correlation position $lM_1$ is determined therefrom. Then, at step #30, it is decided whether the correlation calculation with use of the first block I has a reasonable credibility or not.

If it has a reasonable credibility, a shift amount $P_1$ of image distance is calculated at step #32 after executing an interpolation calculation at step #31.

Next, the program proceeds to step #72 in order to execute the correlation calculation with use of the third block III. If it is decided that the correlation calculation at steps #70 and #71 has not any reasonable creadibility, the program jumps to the step #72.

Similarly to the case of the first and second blocks, the contrast $C_3$ is checked whether minimum or not at step #72 and whether equal to or larger than B at step #73. Then, the correlation calculation with use of the third block is executed at step #36 and at step #37, the maximum correlation position $lM_3$ is sought. After an interpolation calculation at step #41, a shift amount $P_3$ of image distance is calculated at step #42.

Then, at step #43, the maximum value among $P_1$, $P_2$ and $P_3$ is determined to be the most probable deviation amount $P_0$. If any one of the deviation amounts $P_1$, $P_2$ and $P_3$ of image distance is impossible to calculate, it is excepted from the calculation. Then, the program returns to step #13 of FIG. 7.

On the contrary to the above, if the correlation calculation at steps #36 and #37 has not a reasonable credibility, the program proceeds from step #40 to steps #44 and #45 in order to check whether each of the correlation calculations with use of first and second blocks I, II had a reasonable credibility at either step #44 or #45, the program proceeds to step #43 to calculate the most probable deviation amount P of image distance. If all of the correlation calculations are decided to have had no reasonable credibility, the program proceeds to step #10 to execute the low-contrast scanning as mentioned regarding to FIG. 7.

According to the present embodiment, the focus condition detection calculations are carried out with use of only two blocks having contrasts higher than that of the remaining ones. Therefore, the total calculation time of the focus condition is reduced considerably. However, it is also possible to limit the focus condition detection to the block having the highest contast among contrasts of three blocks.

It is to be noted that the number of detection blocks of the standard portion is not restricted to three and can be two or four. Also, it is to be noted that each detection block is not necessarily set so as to overlap with another block. Further, in place of the single line image sensor, there may be provided a plurality of image sensors, each of which is divided into two or more detection blocks.

While the preferred embodiments have been described in detail, modifications and variations being obvious to those skilled in the art are possible without departing from the spirit of the invention. The scope is herefore to be determined solely by the appended claims.

What is claimed is:

1. A focus condition detecting device comprising:
    an objective lens;
    brightness distribution detecting means for detecting the brightness distribution of a plurality of areas in an image formed by the objective lens to produce a plurality of brightness distribution signals, each representing the detected brightness distribution of each area;
    focus condition signal generating means for generating a plurality of focus condition signals in accordance with the plurality of brightness distribution signals, each focus condition signal representing a direction of defocus and amount of defocus of the objective lens with respect to each area, and
    control means for controlling the focus condition signal generating means with the use of one of the focus condition signals relating to one of the areas so as to restrict the direction of defocus and the range of amount of defocus represented by another focus condition signal relating to another one of the areas.

2. A focus condition detecting device comprising:
    an objective lens;
    brightness distribution detecting means for detecting the brightness distributions of a plurality of areas in an image formed by the objective lens to produce a plurality of brightness distribution signals, each representing the detected brightness distribution of each area;
    focus condition signal generating means for generating, in accordance with the plurality of brightness distribution signals, a plurality of focus condition signals, each representing the focus condition of the objective lens with respect to each area, and
    control means for controlling the focus condition signal generating means with the use of one of the focus condition signals relating to one of the areas, so as to restrict a range covered by another focus condition signal relating to another one of the area.

3. In an autofocus camera having interchangeable objective lens, the improvement of a focus condition detecting device comprising:
    intensity distribution detecting means for detecting the intensity distributions of a plurality of areas in an image formed by the objective lens to produce a plurality of intensity distribution signals, each representing the detected intensity distribution of its respective area;
    focus condition signal generating means for generating, in accordance with the plurality of intensity distribution signals, a plurality of focus condition signals, each representing the focus condition of the objective lens with respect to each area, and
    control means, controlling the focus condition signal generating means with the use of one of the focus condition signals relating to one of the areas, for restricting a range of defocus covered by another focus condition signal relating to another one of the areas.

* * * * *

UNITED STATES PATENT OFFICE
CERTIFICATE OF CORRECTION

Patent No. 4,816,861          Dated March 28, 1989

Inventor(s) Nobuyuki Taniguchi et al.

It is certified that error appears in the above-identified patent and that said Letters Patent is hereby corrected as shown below:

Title page, before the patent date insert [45] *, after item [73] insert:

[*] "Notice: The portion of the term of this patent subsequent to December 29, 2004 has been disclaimed."

Signed and Sealed this

Twenty-ninth Day of May, 1990

*Attest:*

HARRY F. MANBECK, JR.

*Attesting Officer*      *Commissioner of Patents and Trademarks*